(12) United States Patent
Lee (10) Patent No.: US 10,430,157 B2
(45) Date of Patent: Oct. 1, 2019

(54) METHOD AND APPARATUS FOR RECOGNIZING SPEECH SIGNAL

(71) Applicant: SAMSUNG ELECTRONICS CO., LTD., Suwon-si (KR)

(72) Inventor: Hoshik Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 14/799,025

(22) Filed: Jul. 14, 2015

(65) Prior Publication Data

US 2016/0210115 A1 Jul. 21, 2016

(30) Foreign Application Priority Data

Jan. 19, 2015 (KR) .......... 10-2015-0008830

(51) Int. Cl.
| | |
|---|---|
| *G10L 15/00* | (2013.01) |
| *G06F 3/16* | (2006.01) |
| *G10L 15/22* | (2006.01) |
| *G10L 25/63* | (2013.01) |

(52) U.S. Cl.
CPC .............. *G06F 3/167* (2013.01); *G10L 15/22* (2013.01); *G10L 25/63* (2013.01); *G10L 2015/226* (2013.01)

(58) Field of Classification Search
CPC ....... G10L 15/22; G10L 15/19; G10L 17/005; G10L 15/30; G10L 15/02; G10L 15/26; G10L 15/01; G10L 2015/221; G10L 15/18; G10L 17/26; G10L 13/08; G10L 15/00; G10L 2015/225; G10L 15/063; G10L 15/28; G10L 2015/085; G10L 2015/223; G10L 2015/226; G10L 25/63
See application file for complete search history.

(56) References Cited

U.S. PATENT DOCUMENTS

| | | | | |
|---|---|---|---|---|
| 5,033,088 A | * | 7/1991 | Shipman | G10L 15/22 |
| | | | | 379/88.01 |
| 5,867,817 A | * | 2/1999 | Catallo | G10L 15/26 |
| | | | | 704/255 |
| 6,044,343 A | * | 3/2000 | Cong | G10L 15/063 |
| | | | | 704/222 |
| 6,253,181 B1 | * | 6/2001 | Junqua | G10L 15/065 |
| | | | | 704/236 |
| 6,665,645 B1 | * | 12/2003 | Ibaraki | G10L 15/20 |
| | | | | 704/226 |
| 7,516,072 B2 | * | 4/2009 | Campbell | B60R 16/0373 |
| | | | | 381/86 |

(Continued)

FOREIGN PATENT DOCUMENTS

| | | |
|---|---|---|
| JP | 2008-311754 | 12/2008 |
| JP | 2012-128440 A | 7/2012 |

(Continued)

*Primary Examiner* — Abdelali Serrou
(74) *Attorney, Agent, or Firm* — NSIP Law (57) ABSTRACT

A speech recognition method and apparatus are provided, in which the speech recognition apparatus may recognize a user feature and a speech recognition environment, determine a speech recognition speed for performing speech recognition based on one of the recognized user feature and the speech recognition environment, and perform the speech recognition based on the determined speech recognition speed.

26 Claims, 8 Drawing Sheets

(56) References Cited

U.S. PATENT DOCUMENTS

| | | | |
|---|---|---|---|
| 8,209,167 B2 | 6/2012 | Imoto | |
| 8,370,139 B2* | 2/2013 | Akamine | G10L 15/20 704/226 |
| 8,504,362 B2* | 8/2013 | Lee | G10L 15/20 704/216 |
| 8,600,746 B1* | 12/2013 | Lei | G10L 15/22 704/235 |
| 8,762,143 B2* | 6/2014 | Gilbert | G10L 15/20 704/233 |
| 9,002,713 B2* | 4/2015 | Ljolje | G10L 15/07 704/275 |
| 9,251,789 B2* | 2/2016 | Morioka | G10L 15/14 |
| 9,613,624 B1* | 4/2017 | Kramer | G10L 15/08 |
| 2003/0050778 A1* | 3/2003 | Nguyen | G10L 15/30 704/235 |
| 2005/0043949 A1* | 2/2005 | Roth | G10L 15/14 704/251 |
| 2005/0131691 A1* | 6/2005 | Fischer | G10L 15/26 704/246 |
| 2005/0159957 A1* | 7/2005 | Roth | G10L 15/22 704/276 |
| 2006/0122834 A1* | 6/2006 | Bennett | G10L 15/1822 704/256 |
| 2007/0136069 A1* | 6/2007 | Veliu | G10L 15/065 704/270 |
| 2007/0244702 A1* | 10/2007 | Kahn | G10L 15/22 704/260 |
| 2007/0260455 A1* | 11/2007 | Akamine | G10L 15/20 704/233 |
| 2008/0103781 A1* | 5/2008 | Wasson | G10L 17/26 704/277 |
| 2008/0140423 A1* | 6/2008 | Kuboyama | G10L 15/22 704/275 |
| 2010/0036660 A1* | 2/2010 | Bennett | G10L 15/30 704/231 |
| 2010/0161326 A1* | 6/2010 | Lee | G10L 15/20 704/233 |
| 2012/0130716 A1* | 5/2012 | Kim | B25J 13/003 704/256.1 |
| 2013/0110492 A1 | 5/2013 | McGraw et al. | |
| 2014/0149118 A1* | 5/2014 | Lee | G10L 15/22 704/251 |
| 2014/0207811 A1* | 7/2014 | Kim | H04N 21/44204 707/758 |
| 2014/0278399 A1* | 9/2014 | Rodman | H04M 3/568 704/233 |
| 2015/0221305 A1* | 8/2015 | Sharifi | G10L 15/26 704/235 |
| 2015/0350438 A1* | 12/2015 | Arslan | G10L 25/63 379/88.01 |

FOREIGN PATENT DOCUMENTS

| | | |
|---|---|---|
| JP | 2014-109770 A | 6/2014 |
| KR | 10-0578652 B1 | 5/2006 |
| KR | 10-1405202 B1 | 6/2014 |

* cited by examiner

METHOD AND APPARATUS FOR RECOGNIZING SPEECH SIGNAL

CROSS-REFERENCE TO RELATED APPLICATION(S)

This application claims the benefit under 35 USC 119(a) of Korean Patent Application No. 10-2015-0008830, filed on Jan. 19, 2015, in the Korean Intellectual Property Office, the entire disclosure of which is incorporated herein by reference for all purposes.

BACKGROUND

1. Field

The following description relates to a speech recognition technology for recognizing a speech signal.

2. Description of Related Art

Recently, speech recognition has been developed to conveniently provide a speech signal an input to control an electronic device rather than having a user manually enter an input, such as by typing. Electronic devices, such as, for example, a smartphone and a tablet personal computer (PC) may provide such a speech recognition function. In one example, an electronic device receives a speech signal from a user. The electronic device converts the received speech signal into text corresponding to the speech signal by analyzing the received speech signal and displays the converted text. In another example, the electronic device analyzes a speech signal received from a user and performs a predetermined function provided by the electronic device by generating a command corresponding to the speech signal of user to perform the predetermined function by the electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition apparatus includes: a memory storing a speech recognition application; and a processing device configured to access the memory and implement the application to cause the processing device to: receive an input associated with one of a user feature and a user environment; determine one of a feature of the user of the recognition apparatus and a speech recognition environment of the speech recognition apparatus using the received input; and determine a speed of processing speech recognition of a speech signal based on the determined one of the user feature or the speech recognition environment.

The processing device also may be configured to access the memory and implement the application to further cause the processing device to: perform speech recognition of the speech signal using the determined speech recognition speed.

The processing device also may be configured to access the memory and implement the application to further cause the processing device to: determine a value of a speech recognition parameter corresponding to the determined speech recognition speed. The speech recognition parameter may be one of a frame time, a window length, and a beam width.

The processing device also may be configured to access the memory and implement the application to further cause the processing device to: determine a feature of the user of the recognition apparatus as one of a personality of the user, an emotion of the user, and a behavior pattern of the user.

The processing device also may be configured to access the memory and implement the application to further cause the processing device to: monitor a usage pattern of the user; and determine the personality of the user based on the usage pattern. The usage pattern may be one of a device usage pattern of the user and a speech recognition usage pattern of the user.

The processing device also may be configured to access the memory and implement the application to further cause the processing device to: recognize the user feature based on one of a facial expression of the user, a voice of the user, a bio-signal of the user, a message created by the user, and a typing pressure.

The processing device also may be configured to access the memory and implement the application to further cause the processing device to: determine the user environment feature based on one of a global positioning system (GPS) sensor, a bio-signal of the user, an application or function implemented by the processing device corresponding to the user environment.

The processing device also may be configured to access the memory and implement the application to further cause the processing device to: receive both an input associated with a user feature and an input associate with a user environment; determine both the feature of the user of the recognition apparatus and the speech recognition environment of the user of the recognition apparatus; and determine the speech recognition speed based on both of the determined user feature and the speech recognition environment.

The processing device also may be configured to access the memory and implement the application to further cause the processing device to: determine the speech recognition speed based on one of the user feature and the speech recognition environment according to an order of priority indicating which of the user feature and the user environment should be used.

The processing device also may be configured to access the memory and implement the application to further cause the processing device to: provide a user interface; receive a user input with respect to a speech recognition speed selected from the user interface; and perform speech recognition based on the selected speech recognition speed.

The memory may store a predetermined value of a speech recognition parameter corresponding to one of a speech recognition speed and a speech recognition speed interval, and the processing device also may be configured to access the memory and implement the application to further cause the processing device to: perform speech recognition based on a value of the speech recognition parameter corresponding to the selected speech recognition speed.

The processing device also may be configured to access the memory and implement the application to further cause the processing device to: perform incremental speech recognition to output a speech recognition result when the speech signal is input.

In another general aspect, a speech recognition method implemented by a processing device of a speech recognition apparatus includes: receiving an input associated with one of a user feature and a user environment; determining one of a feature of the user of the recognition apparatus and a speech recognition environment of the speech recognition apparatus using the received input; and determining a speed of processing speech recognition of a speech signal based on the determined one of the user feature or the speech recognition environment.

The method also may include: performing speech recognition based on the determined speech recognition speed.

The method also may include: performing speech recognition of the speech signal using the determined speech recognition speed.

Determining a value of a speech recognition parameter may include determining the speech recognition parameter comprises one of a frame time, a window length, and a beam width.

The method also may include: determining a feature of the user of the recognition apparatus as one of a personality of the user, an emotion of the user, and a behavior pattern of the user.

Determining the user feature also may include: monitoring a usage pattern of the user; and determining the personality of the user based on the usage pattern.

Monitoring a usage pattern of the user also may include monitoring one of a device usage pattern of the user and a speech recognition usage pattern of the user.

Determining the user feature may include analyzing one of a facial expression of the user, a voice of the user, a bio-signal of the user, a message created by the user, and a typing pressure.

The method also may include: determining the speech recognition environment feature based on one of a global positioning system (GPS) sensor, a bio-signal of the user, an application or function implemented by the processing device corresponding to the user environment.

Receiving an input associated with one of a user feature and a user environment may include receiving both an input associated with a user feature and an input associate with a user environment; and determining one of a feature of the user of the recognition apparatus and the speech recognition of the recognition apparatus may include determining both the feature of the user of the recognition apparatus and the speech recognition environment of the user of the recognition apparatus; and determining the speech recognition speed based on both of the determined user feature and the speech recognition environment.

The method also may include: determining an order of priority indicating which of the user feature and the speech recognition environment should be used to determining the speech recognition speed; and determining the speech recognition speed using one of the determined one of the user feature or the speech recognition environment based on the determined order of priority.

The method also may include: providing a graphical user interface for the speech recognition apparatus; receiving a user input with respect to a speech recognition speed selected from the user interface; and performing speech recognition of the speech signal based on the selected speech recognition speed.

The method also may include: storing a predetermined value of a speech recognition parameter corresponding to one of a speech recognition speed and a speech recognition speed interval; and performing speech recognition of the speech signal based on a value of a speech recognition parameter corresponding to the selected speech recognition speed.

Performing speech recognition based on the determined speech recognition speed may include perform incremental speech recognition on the speech signal to output a speech recognition result.

In another general aspect, a non-transitory computer-readable storage medium includes a program comprising instructions to cause a computer to perform the above-described method Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for conciseness and to increase clarity.

The features described herein may be embodied in different forms and are not to be construed as being limited to the examples described herein. Rather, the examples described herein have been provided so that this disclosure is thorough and complete, and conveys the full scope of the disclosure to one of ordinary skill in the art.

Figure 1A:
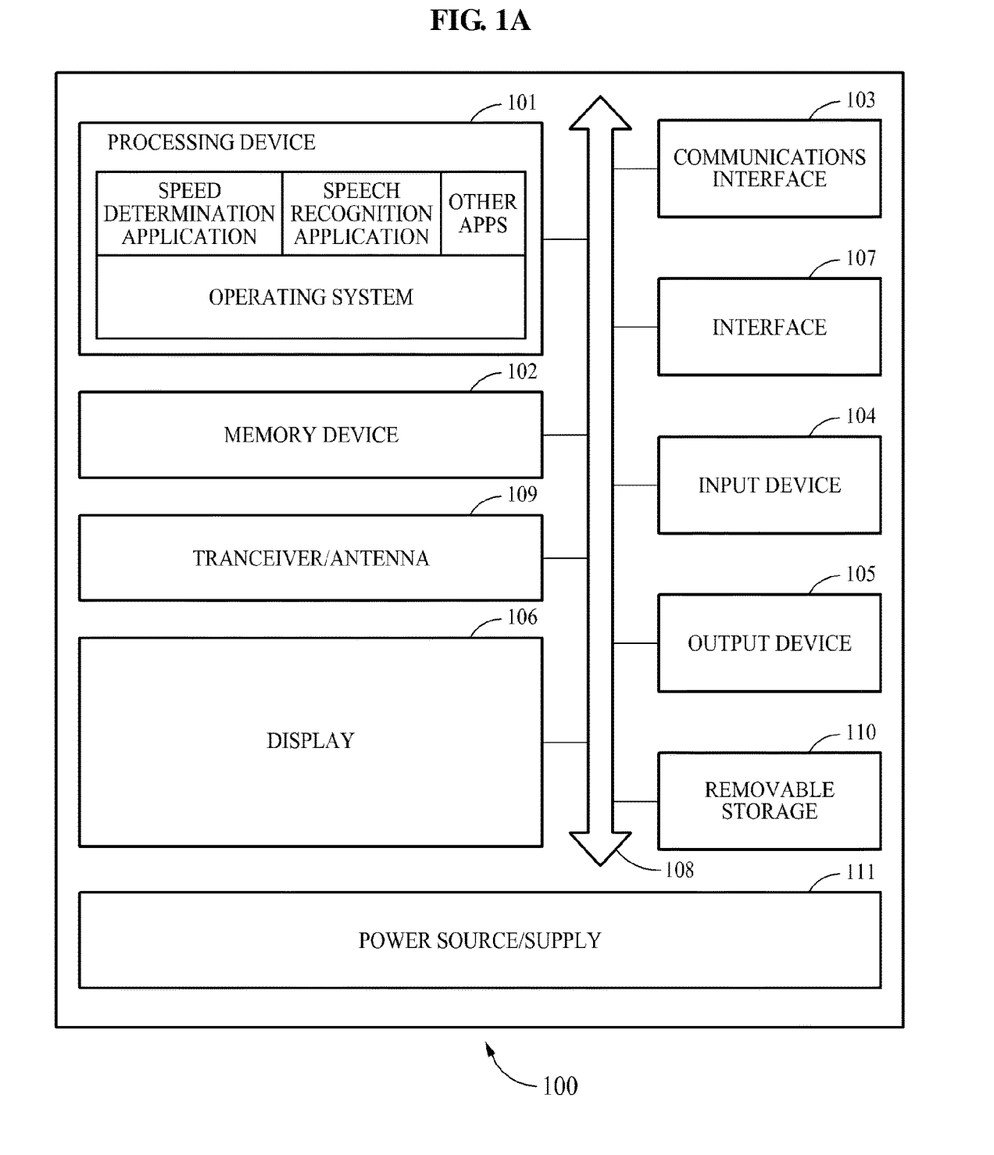
FIGS. 1A and 1B are a block diagrams illustrating examples of a speech recognition apparatus.

FIG. 1A is a block diagram of an example of a user device 100 providing speech recognition. For example, the user device may be a consumer electronics device, a mobile phone, a smart phone, a personal data assistant, a digital tablet/pad computer, a hand held or mobile computer, a personal computer, a notebook computer, a work station, a vehicle computer, a game system, a set-top-box, or any other device that includes a processing device implementing a speech recognition application.

FIG. 1 shows one example of a user device 100; however, it will be appreciated that this device is only exemplary and that any number of, types of, or configurations of different components and software may be incorporated into or omitted from the device according to the intended application or use in any particular user environment. The user device includes any number of components including one or more processing devices 101 and one or more non-transitory storage devices 102. A user device also may include additional components including one or more of the following: a communications interface 103 to send and/or receive signals in one or more communication formats allowing the user device to communicate or exchanged data with other devices, an input device 104, (e.g., a touch screen, a keyboard, a key pad, a mouse, a pointer device, a trackball, a joystick, a user physiological monitoring, sensor, or detecting device, such as a heart rate or temperature monitor, a microphone, digital camera, an optical reader (e.g., a bar code scanner or an infrared scanner), an RFID reader), an output device 105 (e.g., speakers), a display 106, an interface 107 (e.g., a WIFI or Blue Tooth interface), a communications bus 108 allowing various components of the user device to access and/or exchange data, an antenna/transmitter and/or transceiver controller 109 to provide wireless communications with other devices, a removable storage device 110, and a power source or supply 111 to receive and/or provide power to the various components of the user device. A user device also may include one or more associated peripheral devices (not shown), such as, for example, a display, a memory, a printer, an input device, an output device, and speakers. As is appreciated by those skilled in the art, any of these components (other than at least one processing device) may be included or omitted to create different configurations or types of user devices, for example, to perform specific or specialized needs or tasks, generalized needs or multiuse tasks, or for various performance criteria, such as, mobility, speed, cost, efficiency, power consumption, ease of use, among others.

A processing device 101 may be implemented using one or more general-purpose or special purpose computer, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS including a speech recognition application and/or speech speed determination application in addition to other application (e.g., a messaging application, a navigation application, an email application, mobile applications, etc.). The processing device also may access, store, manipulate, process, and create data in response to execution of the applications. For purpose of simplicity, the description of a processing device is used as singular; however, one skilled in the art will appreciated that a processing device may include multiple processing elements or devices and multiple types of processing elements or devices. For example, a processing device may include multiple processors or a processor, registers or buffers, a memory, and a controller. In addition, different processing configurations are possible, such as serial processors, parallel processors, a quad processor, a main processor and a display processor or caching processor, among others.

As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software or applications implemented by the processing device may include a computer program, a piece of code, an instruction, or some combination thereof, for independently or collectively instructing or configuring the processing device to operate or perform functions as desired. Examples of software applications include: an operating system, drivers to control and/or operate various components of the user device (e.g., display, communications interface, input/output devices, etc.). In addition, a user interface application, a browser and/or a mobile browser application, a speech recognition application, and/or speech speed determination application, and other applications (e.g., a messaging application, a navigation application, an email application, mobile applications, etc.) may be provided. The applications may be resident in the processing device, loaded from a storage device, or accessed from a remote location or a storage device, as described in greater detail below. Once the applications are loaded in or executed by the processing device, the processing device becomes a specific machine or apparatus configured to perform functions, such as to provide a user interface, perform speech recognition, or determine a speech recognition speed, among others. That is to say a user device with a processing device programmed in a certain way is physically different machine than that of a user device without that program as its memory elements are differently arranged and/or configured.

The software, applications, content, and data may be embodied permanently or temporarily in any type of machine, component, physical or virtual equipment, computer storage medium or device, or in a propagated signal wave capable of providing instructions or data to or being interpreted by the processing device. In particular, the software, applications, content, or data may be stored by one or more non-transitory computer storage devices or mediums 102, 110 including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the storage device is read or accessed by the processing device, the specified steps, processes, and/or instructions are performed and/or data is accessed, processed, and/or stored. The computer storage device may include an I/O interface, such that data and applications may be loaded and stored in or accessed or read from the computer storage device allowing the applications, programming, and data to be used, updated, deleted, changed, augmented, or otherwise manipulated. The computer storage device 110 may be removable, such as, for example, a disk drive, a card, a stick, or a disk that is inserted in or removed from the user device.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

Figure 1B:
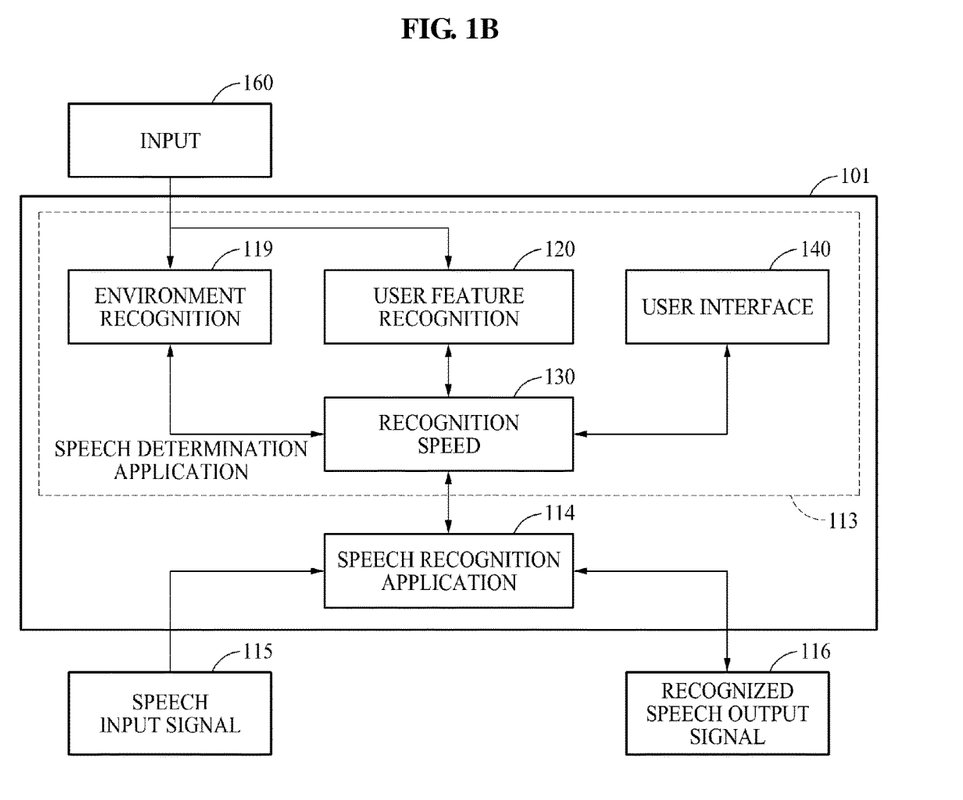

FIG. 1B is a block diagram illustrating an example of a processing device implementing a speech recognition apparatus.

The processing device 101 implements a speed determination application 113 and a speech recognition application 114. Although two applications are shown, one skilled in the art will appreciate that the functionality of the applications may be implemented in a number of different configurations. For example, the speed determination application could be implemented as part of the speech recognition application. In addition, the user interface function could be implemented a separate application, as part of the speech recognition application, or as part of a user interface for the user device. Therefore, other configurations are contemplated for the functionality provided by the apparatus in FIG. 1B, and the configuration shown in FIG. 1B is only one example of a configuration for a processing device implementing a speech recognition apparatus.

The speech recognition application 114 recognizes a speech input signal 115 and outputs a speech recognition result 116. The speech recognition application 114 outputs a recognition result 116 by continuously recognizing the speech input signal 115. The speech input signal 115 is input for an incremental speech recognition scheme of the speech recognition application 114. For example, the speech recognition application 114 may output a speech recognition result by immediately recognizing an input speech signal. In addition, as the length of a speech signal increases, the speech recognition application 114 may output a new speech recognition result to correct or update a previously output result. The speech recognition application 114 performs speech recognition processing of the speech input signal 115 based on a speech recognition speed determined by the speech recognition speed application 113 and outputs a speech recognition result 116. For example, the speech recognition application 114 processes the input signal 115 to perform speech recognition by applying a value of a speech recognition parameter corresponding to a speech recognition speed received from the speech recognition speed application 113.

The speech recognition speed application 113 operates in two modes: a manual mode to provide a speech recognition speed selected by a user; and an automatic mode to automatically determine the speech recognition speed by the processing device. In the automatic mode, the speech recognition speed application 113 automatically determines an optimal speech recognition speed based one or more of a personal feature of a user and a speech recognition environment. The speech recognition speed application 113 provides a speech recognition speed to the speech recognition application 114. The speech recognition application 114 processes the speech signal 115 based on the speech recognition speed to determine the speech recognition result 116. The speech recognition speed application 113 determines the speed at which the speech recognition result 116 is to be output, for example, faster or slower, by analyzing a user feature and the speech recognition environment.

Generally, the accuracy of a speech recognition result depends on the speed at which the speech signal 115 is processed. Generally, accuracy is inversely proportional to the speech recognition speed. For example, accuracy decreases when speech recognition speed increases, and accuracy increases when speech recognition speed decreases; therefore, there is generally a tradeoff between speed and accuracy. Whether a user requires a fast speech recognition speed or an accurate speech recognition result may vary based on a number of factors, such as, for example, a personality of a user, an emotion of a user, or an environment in which speech recognition is performed. For example, an impatient user may prefer a faster recognition speed despite a sacrifice in accuracy. In another example, a user creating a message using speech recognition may prefer a more accurate speech recognition result despite a slower recognition speed.

Referring to FIG. 1B, speech recognition speed application 113 includes a user feature recognition function 119, a speech recognition environment function 120, a speech recognition speed function 130, and a user interface 150 that are implemented by a processing device of the user device executing speech recognition speed application 113. The processing device receives an input 160 relating to a user condition (e.g., a user feature and/or a speech recognition environment) and a speech input signal 115, processes the signals 160, 115, and provides a speech recognition result 116. For example, the user input condition may be input via an input or an interface of the user device (e.g., a serial port, a communications interface, a transceiver, a camera, a touch screen, a microphone, an application running on the user device, among others) and transferred via a communications bus to the processing device. In another example, the input may be stored in a storage device and accessed by the processing device.

The user feature recognition function 119 recognizes a user feature, for example, one or more of an emotional condition of a user, a personality of a user, a behavior pattern of a user, and the like.

In one example, the user feature recognition function 119 recognizes an emotional condition of the user. The user feature recognition function 119 analyzes the user input 160 to determine the emotional condition of the user. The input 160 may be a face, a voice, a user interaction signal, or a physiological or bio-signal, among others. For example, the input 160 may be one of: a picture of the face of the user captured through a camera, a voice of a user captured through a microphone, the pressure of finger on a touch screen, a heart rate or pulse from a bio physical sensor.

The user feature recognition function 119 analyzes input 160 to determine an emotional condition of the user. For example, the user function 110 processes an expression in a picture of a user using facial recognition algorithms to determine a corresponding emotional state matching the expression (e.g., a frown may correspond to frustration). The voice of a user, for example, is analyzed for speech semantics or a cadence of the voice of a user to determine a corresponding emotional state (e.g., fast cadence may indicate impatience). In another example, the typing of a user creating a message on a touchscreen may be analyzed for the amount of pressure applied on the screen by the user (e.g., increased pressure may signal frustration). A bio-signal, for example, a heart rate may be measured/monitored using input from an electrocardiogram (ECG) or a pulse monitor that is input to the user device (e.g., a fast heart beat or pulse may indicate anxiety).

The user feature recognition function 119 may recognize the personality of the user by analyzing a pattern in which the user uses a device or the speech recognition function. For example, the user feature recognition function 119 may determine whether the personality of the user is more impatient or patient by analyzing a pattern of usage of the functions of the user of the device, for example, web browsing. In addition, the user feature recognition function 119 may recognize the personality of the user by analyzing the reaction of the user after outputting a speech recognition result.

When a user uses a speech recognition function of the user device, the user feature recognition function 119 may determine a personality of the user by analyzing a correlation between an emotion of the user and the amount of time to output the speech recognition result. The user feature recognition function 119 also may determine the emotion of the user by analyzing a voice of a user or a facial expression of a user subsequent to outputting the speech recognition result.

In another example, the user feature recognition function 119 determines a personality type of the user by analyzing a correlation between an emotion expressed by a user when the speech recognition result is output and the amount of time needed to output the speech recognition result. For example, when the emotion of the user is determined to be negative and the amount of time needed to output the speech recognition result is small, the user feature recognition function 119 determines that the personality of the user is relatively impatient.

The speech recognition environment function 120 recognizes the speech recognition environment corresponding to an environment in which the speech recognition is performed by the user device. For example, the speech environment recognition function 120 may determine whether a user using speech recognition while driving or exercising. The speech recognition environment function 120 may determine the environment corresponds to a user driving using an input 160 provided to the processing device indicating the position of the user device is moving as measured by a global positioning system (GPS) sensor. Similarly, the speech environment recognition function 120 may determine whether the user is currently exercising by analyzing an input 160, such as a bio-signal of the user that is provided to the processing device. The speech recognition environment function 120 may determine whether the user is attempting to use another application in addition to using speech recognition, for example, trying to operate a navigation apparatus or to transmit a message while driving, by monitoring other functions or applications currently being processed by the processing device.

In an automatic mode, the speech recognition speed function 130 determines a speech recognition speed based on one of a recognition result of the user feature recognition function 119 and a recognition result of the speech recognition environment function 120. For example, the speech recognition speed function 130 may determine a speed recognition result that is optimized based on a user feature and a speech recognition environment to determine a value of a speech recognition parameter corresponding to the speed at which the speech recognition application 114 processes the speech input signal 115.

For example, the speech recognition parameter may include a window length, a frame time, a beam width, and the like. The processing device controls the speed at which the speech recognition application 114 processes the speech signal 115 by adjusting the value of the speech recognition parameter. The window length and the frame time are speech recognition parameters that determine a length of speech signal required for acoustic model recognition by dividing a speech frame. The beam width is a decoding parameter, for example, used for a Viterbi search. Beam width also is a speech recognition parameter that determines a number of tokens for which speech recognition is to be performed.

The speech recognition speed function 130 may determine the speech recognition speed based on one of the user feature and the speech recognition environment according to an order of priority when a feature and an environment are both available, or the speech recognition speed function 130 may determine the speech recognition speed based on both of the user feature and the speech recognition environment.

In one example, the speech recognition speed function 130 determines a speech recognition speed to perform speech recognition based on a user feature determined by the user feature recognition function 119. For example, when a personality of a user is determined to be a type, such as impatient, the speech recognition speed function 130 determines a speech recognition speed that prioritizes speed of processing the speech signal 115 over accuracy of the speech recognition result 116. In another example, when a current emotional condition of a user is determined to be of a type, such as impatient, the speech recognition speed function 130 determines a speech recognition speed that processes the speech signal 115 faster.

In another example, the speech recognition speed function 130 determines a speech recognition speed to perform speech recognition based on a speech recognition environment. The speech recognition speed function 130 determines whether the speech recognition environment corresponds to an environment that requires a fast speech recognition speed or an environment that requires highly accurate recognition results to regulate the speech recognition speed based on a result of the determination. For example, when a user inputs a destination to a navigation system using speech recognition while driving, a faster speech recognition speed may be desired due to a speech recognition environment in which the user is driving. In another example, when a user transmits a message using speech recognition while driving, a relatively high accuracy of speech recognition may be desired in addition to the fast speech recognition speed in order to transmit message content that is accurate.

In yet another example, the speech recognition speed function 130 may determine a speech recognition speed based on one of the user feature and the speech recognition environment when both are available. The speech recognition speed function 130 may determine a value of a speech recognition parameter in order to enable the speech recognition to be relatively fast based on a recognition result of one of the user feature and a recognition result of the speech recognition environment. For example, when a user inputs a destination to a navigation system while driving using speech recognition, the speech recognition environment function 120 may recognize an environment in which the user is driving. Alternatively, the user feature recognition function 119 may analyze a voice of the user and recognize that the user is currently in a critical emotional condition. In yet another example, the user feature recognition function 110 may analyze an emotion recognition pattern and a device usage pattern of a user and recognize that the usual type personality of a user is patient. When the speech recognition environment function 120 recognizes that the user inputs a destination to a navigation system while driving using speech recognition, the speech recognition speed function 130 may give priority to the speech recognition environment and determine the value of speech recognition parameter in order to enable the speech recognition to be performed relatively fast.

The speed determination application 113 may include a user interface function 150. The user interface function 150 provides the user with an interface to control operation of the speed determination application 113. For example, a user interface function 150 may control an output to provide output for a user to select operation of speech speed recognition in a manual mode or an automatic mode. In the manual mode, the speech recognition speed is manually selected by a user. For example, the user may directly select the speech recognition speed through a graphical user interface (GUI) generated by the function 150.

The speech recognition speed function 130 recognizes the speech recognition speed selected by the user from the user input. The speech recognition speed function 130 provides the selected speed as a value, such as a speech recognition parameter of the speech recognition application 114. The speech recognition application 114 performs the speech recognition based on the speech recognition speed selected by the user. For example, the speech recognition application 114 may perform the speech recognition by applying the value of the speech recognition parameter, for example, a window length and a beam width, corresponding to the speech recognition speed selected by the user. Speech recognition parameter information corresponding to each speech recognition speed may be determined in advance and stored in a memory device. The processing device provides the interface (e.g., an output such as a user interface screen) and receives a user selection input by the user in response to the provided user interact. When the user selects a predetermined speech recognition speed provided by the interface screen, the speed determination application instructs the processing device to determine a value of a speech recognition parameter corresponding to the speech recognition speed selected by the user. The processing device may access the value of the speech recognition parameter corresponding to the speech recognition speed from speech recognition parameter information stored in a memory device in advance and perform speech recognition based on the extracted value of the speech recognition parameter. The speech recognition parameter information may include information associated with the value of the speech recognition parameter corresponding to the speech recognition speed.

Figure 2A:
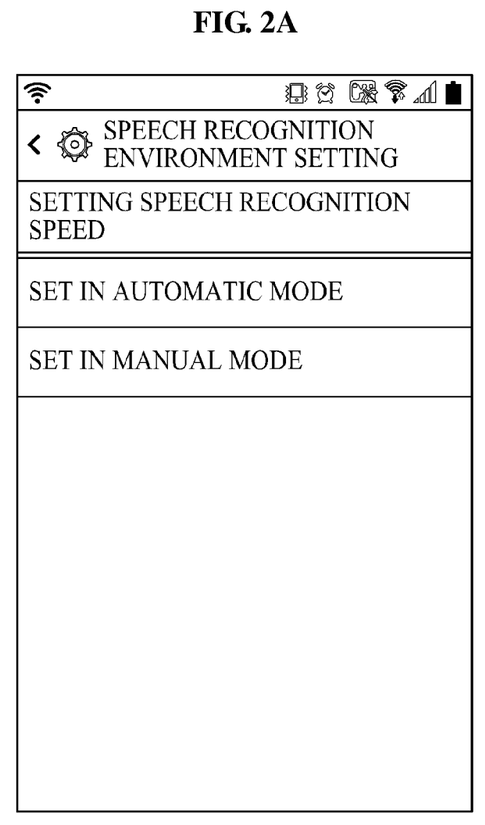
FIGS. 2A and 2B are screen shots of examples of a user interface.
Figure 2B:
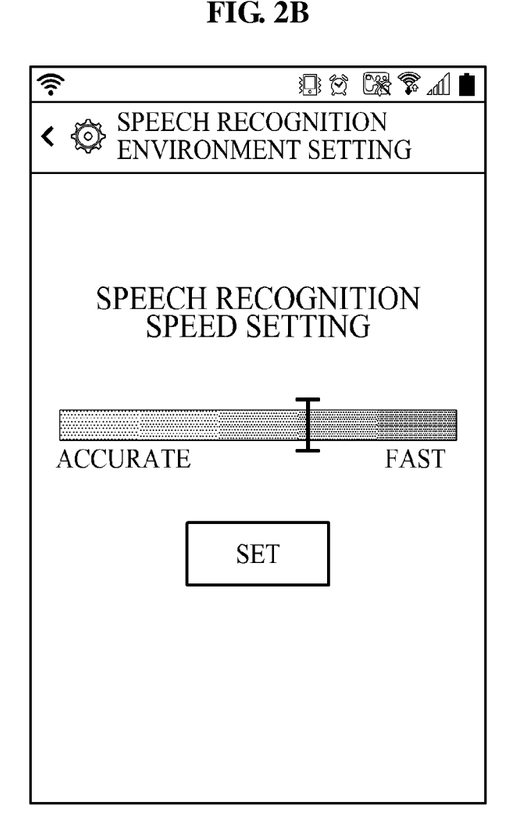

FIGS. 2A and 2B are screen shots illustrating examples of a user interface for selecting a speech recognition performance mode.

FIG. 2A illustrates an example of a user interface screen provided for use with the speech speed recognition application 113 and/or the speech recognition application 114. The processing device implements the user interface function 150 to provide a menu screen enabling a user to select a speech recognition performance mode. The user may enable the speed determination application 113 to automatically set (e.g., operating in an automatic mode) a speech recognition speed or enable the user to directly select (e.g., operating in manual mode) the speech recognition speed.

FIG. 2B illustrates an example of an interface screen provided when the user selects the automatic mode. The processing device implements the user interface function 150 to provide a graphical user interface (GUI), such as a slide-bar. The slide bar allows the user to select the speech recognition speed by manipulating the slide-bar.

FIGS. 3A, 3B, 3C, and 3D are flow charts illustrating examples of methods for speech recognition.

Figure 3A:
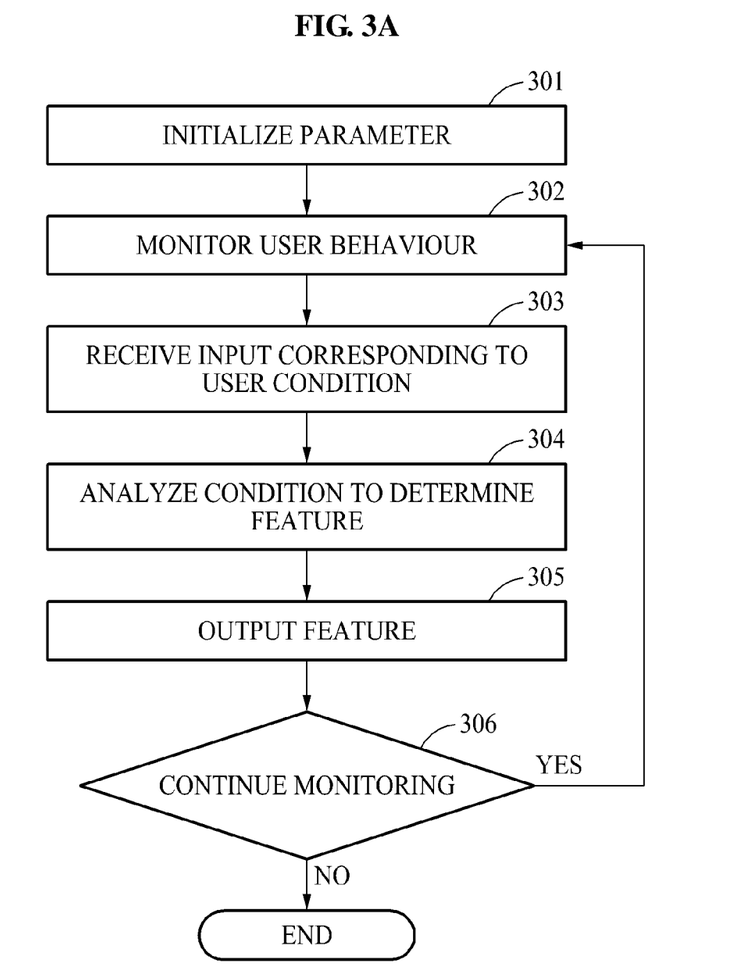
FIGS. 3A, 3B, 3C, and 3D are a flow charts illustrating examples of a speech recognition method.

FIG. 3A is a flow chart illustrating an example of the method for user feature determination. The user feature determination method may be used in the automatic mode. The processing device implements the user feature determination method as part of the user feature recognition function 119.

In operation 301, the processing device initializes parameters. For example, the processing device may start with a neutral, a default, or a historical user feature or speech parameter at the start of the process.

In operation 302, the processing device the processing device monitors user activity. For example, the processing device may the way in which the user uses a device or the speech recognition function. For example, the processing device may monitor a pattern of usage of the functions of the user of the device, for example, web browsing. In addition, the processing device may monitor the reaction of the user after outputting a speech recognition result.

In operation 303, the processing device receives input corresponding to a user condition. For example, the processing device received or access an input corresponding to an emotional condition or feature of the user. For example, the input may be a face, a voice, a user interaction signal, or a physiological or bio-signal, among others. For example, the input may be one of: a picture of the face of the user captured through a camera, a voice of a user captured through a microphone, the pressure of finger on a touch screen, a heart rate or pulse from a bio physical sensor.

In operation 304, the processing device analyzes a user condition to determine a user feature. For example, the processing device processes an expression in a picture of a user using facial recognition algorithms to determine a corresponding emotional state matching the expression (e.g., a frown may correspond to frustration). The voice of a user, for example, is analyzed for speech semantics or a cadence of the voice of a user to determine a corresponding emotional state (e.g., fast cadence may indicate impatience). In another example, the typing of a user creating a message on a touchscreen may be analyzed for the amount of pressure applied on the screen by the user (e.g., increased pressure may signal frustration). A bio-signal, for example, a heart rate may be measured/monitored using input from an electrocardiogram (ECG) or a pulse monitor that is input to the user device (e.g., a fast heart beat or pulse may indicate anxiety).

In another example, the processing device may determine the personality of the user by analyzing the pattern in which the user uses a device or the speech recognition function. For example, the user feature recognition function 119 may determine whether the personality of the user is more impatient or patient by analyzing the pattern of usage of the functions of the user of the device, for example, web browsing obtained while monitoring the user in operation 302.

When the processing device also may determine a personality of the user by analyzing a correlation between an emotion of the user and the amount of time to output the speech recognition result, and determine the emotion of the user by analyzing a voice of a user or a facial expression of a user subsequent to outputting the speech recognition result.

In another example, the processing device determines a personality type of the user by analyzing a correlation between an emotion expressed by a user when the speech recognition result is output and the amount of time needed to output the speech recognition result. For example, when the emotion of the user is determined to be negative and the amount of time needed to output the speech recognition result is small the processing device determines that the personality of the user is relatively impatient.

In operation 305, the processing device outputs or saves the determined user feature. For example, the determined user feature may be output or saved as an input to the speech recognition speed function or processes.

In operation 306, the processing device determines whether to continue monitoring user conditions. If it is determined that user conditions should be continued to be monitored, the processing device returns to operation 302; otherwise, the process ends.

Figure 3B:
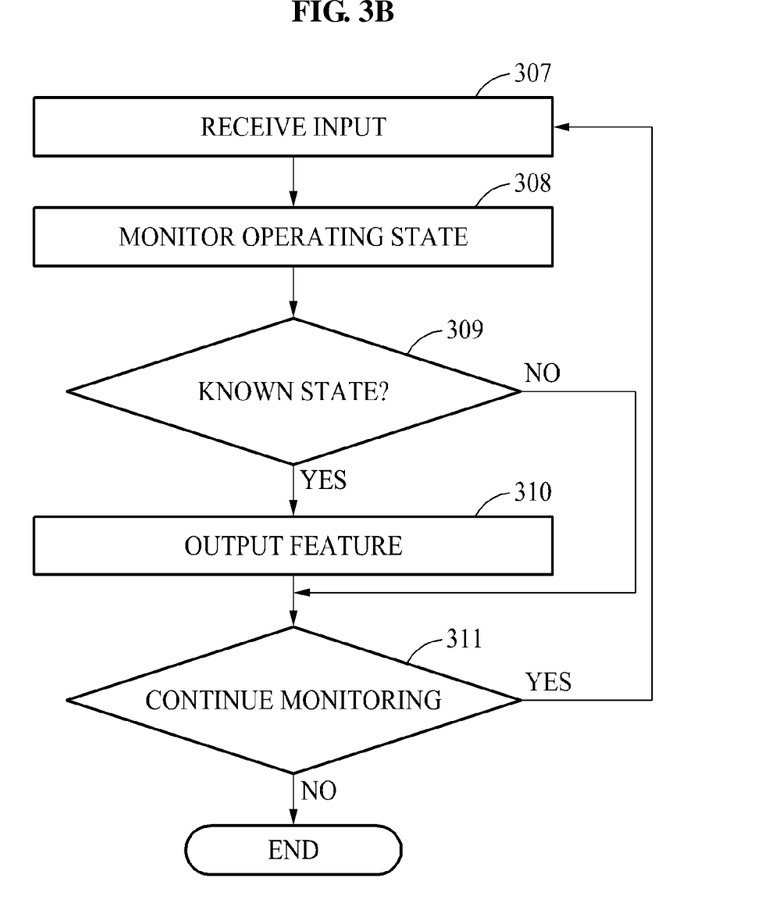

FIG. 3B is a flow chart illustrating an example of the method for user environment determination. The user environment determination method may be used in the automatic mode. The processing device implements the user environment determination method as part of the user environment recognition function 120.

In operation 307, the processing device the processing device monitors the user environment. For example, the processing device may keep track of other applications that are in use by the processing device and inputs relating to a user speech recognition environment. The processing device may monitor the environment by receiving or sensing information collected through variable sensors, information associated with an image photographed through a camera, information associated with an adjacent sound measured through a microphone, and the like.

In operation 308, the processing device analyzes an input corresponding to the user environment to determine the environment of a user. For example, the processing device may determine whether a user using speech recognition while driving or exercising. The processing device determines the environment corresponds to a user driving using an input provided to the processing device indicating the position of the user device is moving as measured by a global positioning system (GPS) sensor (e.g., the speed derived from the movement is consistent with the speed of operation of a motor vehicle). Similarly, the processing device may determine whether the user is currently exercising by analyzing an input, such as a bio-signal of the user that is provided to the processing device or the use of an application associated with exercise. The processing device also may determine an environment by determining whether the user is attempting to use another application in addition to using speech recognition, for example, trying to operate a navigation apparatus or to transmit a message while driving, by monitoring other functions or applications currently being processed by the processing device.

In operation 309, the processing device determines whether the environment has changed since a previous output. If the environment has not changed the processing device returns to operation 307. If the environment has changed, the processing device proceeds to operation 310, and outputs or saves the determined user environment. For example, the determined speech recognition environment may be output or saved as an input to the speech recognition speed function or processes.

In operation 311, the processing device determine whether to continue monitoring user environment. If it is determined that the user environment should be continued to be monitored, the processing device returns to operation 307; otherwise, the process ends.

Figure 3C:
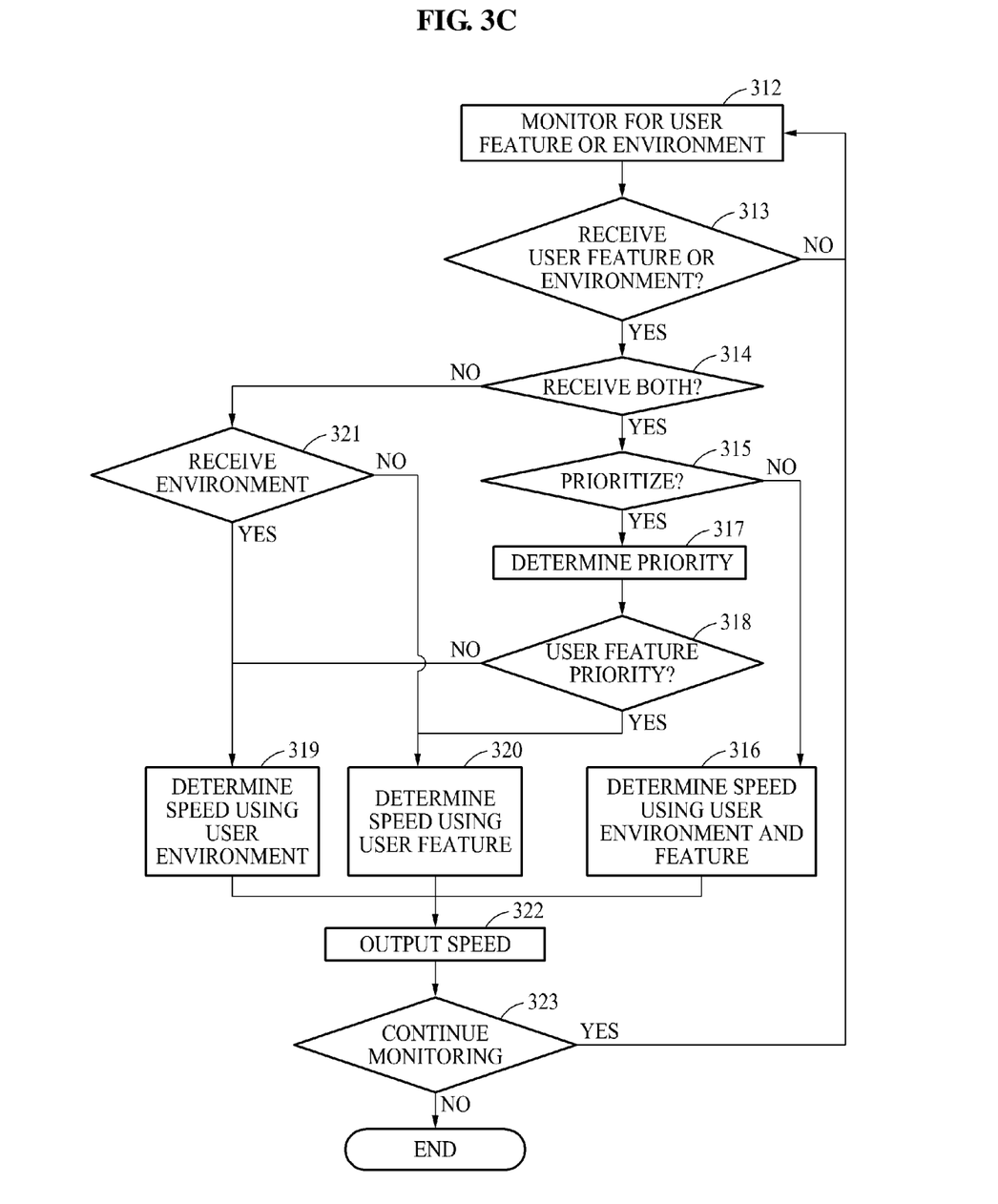

FIG. 3C is a flow chart illustrating an example of the method for determination of a recognition speed. The speed recognition determination method may be used in the automatic mode. The processing device implements the speed recognition determination method as part of the recognition speed function 130.

In operation 312, the processing device monitors for an input of a user environment and a user feature (e.g., from the user feature recognition function 119 or the user environment recognition function 120).

In operation 313, the processing device determines whether a user feature or environment is received. If none is received, the processing device returns to operation 312. If a user feature or environment is received, in operation 314 the processing device determines whether both a user feature and environment are received.

If both are received, in operation 315 the processing device determines whether to prioritize use of the user feature or the user environment. If the processing devices determines not to prioritize, in operation 316 the processing device determines a speech recognition speed using both the user feature and the user environment.

If the processing devices determines to prioritize, in operation 317 the processing device determine the priority. In operation 318, the processing device determines whether to give the user feature priority. If the processing devices determines to give the user feature priority, in operation 319 the processing device determines a speech recognition speed using the user feature. If the processing devices determines to give the user environment priority, in operation 320 the processing device determines speech recognition speed using the user environment. For example, when a personality of a user is determined to be a type, such as impatient, the processing device determines a speech recognition speed that prioritizes speed of processing the speech signal over accuracy of the speech recognition result. In another example, when a current emotional condition of a user is determined to be of a type, such as impatient, the processing device determines a speech recognition speed that processes the speech signal faster.

If in operation 314 the processing device determines that only one of the feature or environment are received, in operation 321 the processor determines whether the environment was received. If the processing devices determines to a user feature was received, in operation 319 the processing device determines speech recognition speed using the user feature (as described above). If the processing devices determines to a user environment was received, in operation 320 the processing device determines speech recognition speed using the user environment. For example, when a user inputs a destination to a navigation system using speech recognition while driving, a faster speech recognition speed may be determine due to a speech recognition environment in which the user is driving. In another example, when a user transmits a message using speech recognition while driving, a relatively high accuracy of speech recognition may be desired in addition to the fast speech recognition speed in order to transmit message content that is accurate.

The processing device may determine an optimized speech recognition speed suitable for a user feature or a speech recognition environment and determine a value of a speech recognition parameter corresponding to the determined speech recognition speed in operations 316, 319, and 320. The processing device may extract the feature of the speech recognition parameter corresponding to the speech recognition speed from speech recognition parameter information stored in advance. The speech recognition parameter information may include information associated with the value of the speech recognition parameter corresponding to the speech recognition speed.

In operation 322, the processing device outputs or saves the determined recognition speed. For example, the recognition speed may be a value of the speech recognition parameter corresponding to the speed at which a speech recognition application processes a speech input signal. For example, the speech recognition parameter may include a window length, a frame time, a beam width, and the like. The processing device controls the speed at which the speech recognition application processes the speech signal by adjusting the value of the speech recognition parameter. The window length and the frame time are speech recognition parameters that determine a length of speech signal required for acoustic model recognition by dividing a speech frame. The beam width is a decoding parameter, for example, used for a Viterbi search. Beam width also is a speech recognition parameter that determines a number of tokens for which speech recognition is to be performed.

In operation 323, the processing device determines whether to continue determining the recognition speed. If the processing device determines that the speed recognition should be continued to be monitored, the processing device returns to operation 312; otherwise, the process ends.

Figure 3D:
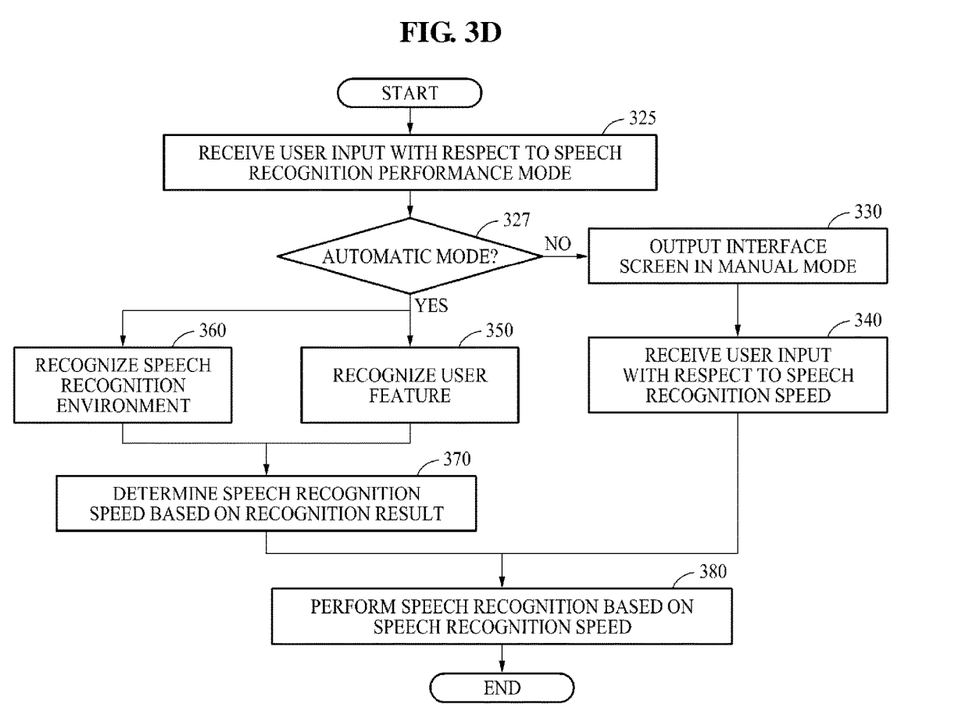

FIG. 3D is a flow chart illustrating an example of method for speech recognition.

In operation 325, a speech recognition apparatus receives a user input with respect to a speech recognition performance mode including an automatic mode and a manual mode. For example, the processing device may provide a menu screen enabling a user to select the speech recognition performance mode, such as that shown in FIG. 2A. The user may determine select an automatic mode allowing the speech recognition apparatus to automatically select a speech recognition speed, or a manual mode allowing the user direct select the speech recognition speed.

In operation 327, the speech recognition apparatus may determine whether the user input received in operation 325 is the automatic mode or the manual mode.

In operation 330, when the user input is determined to be the manual mode, the processing devices output an interface screen corresponding to the manual mode, such as, for example, the screen shown in FIG. 2B. In one example, the processing device may provide a UI such as a slide-bar enabled to select the speech recognition speed.

In operation 340, the processing device receives the user input based on the speech recognition speed selected by the user. The user may directly select the speech recognition speed by adjusting the slide-bar on the interface screen.

In operation 380, the processing device performs speech recognition based on the speech recognition speed selected by the user in operation 340 and outputs a speech recognition result. For example, the processing device may extract a value of a speech recognition parameter corresponding to the speech recognition speed selected by the user from speech recognition parameter information stored in advance and perform speech recognition based on the extracted value of the speech recognition parameter.

When the user input received in operation 325 is determined to be the automatic mode, the processing device may initialize speech recognition parameters. In operation 350, the processing device may collect user behavior data and recognize a user feature based on the collected user behavior data. The processing device may collect the user behavior data including device usage information and speech recognition usage information of the user after the user selects the automatic mode.

For example, the processing device may recognize a user feature, for example, a personality of a user, an emotion of a user, a behavior pattern of a user, and the like. The processing device may recognize an emotional condition by analyzing a facial expression of a user photographed through a camera or a voice of a user input through a microphone. In another example, the processing device may recognize the emotional condition by analyzing a biosignal, a typing pressure, a message created by a user, and the like. The processing device may recognize a personality of the user by analyzing a device usage pattern or a speech recognition usage pattern of the user.

In operation 360, the processing device may recognize a speech recognition environment. For example, the processing device may determine whether the user is to use the speech recognition while driving or exercising. The processing device may recognize the speech recognition environment based on sensing information collected through variable sensors, information associated with an image photographed through a camera, information associated with an adjacent sound measured through a microphone, and the like.

In operation 370, the processing device may determine a speech recognition speed to be applied to speech recognition based on one of a recognition result in operation 350 and a recognition result in operation 360. The processing device may determine an optimized speech recognition speed suitable for a user feature or a speech recognition environment and determine a value of a speech recognition parameter corresponding to the determined speech recognition speed. The processing device may extract the feature of the speech recognition parameter corresponding to the speech recognition speed from speech recognition parameter information stored in advance. The speech recognition parameter information may include information associated with the value of the speech recognition parameter corresponding to the speech recognition speed.

In operation 380, the processing device may perform speech recognition based on the speech recognition speed determined in operation 370 and output a speech recognition result. For example, the processing device may perform the speech recognition by applying, to a recognizer, the value of the speech recognition parameter corresponding to the speech recognition speed. The processing device may output the recognition result by continuously recognizing an input speech signal when all speech signals are input. According to an increase in a length of the speech signal, the processing device may correct and output the speech recognition result previously output.

While this disclosure includes specific examples, it will be apparent to one of ordinary skill in the art that various changes in form and details may be made in these examples without departing from the spirit and scope of the claims and their equivalents. For example, the operation and performance of various functions above may be provided in a distributed fashion. For example, although the processing device 101 implementing the speech recognition is shown above in a user device, in another example, according to an operation method of speech recognition, a value of a speech recognition parameter corresponding to a speech recognition speed selected by a user may be transmitted to a speech recognition server, and the speech recognition server may perform the speech recognition based on the received value of the speech recognition parameter. A result of the speech recognition performed by the speech recognition may be transmitted and output to the user device.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition apparatus, comprising:
a processor;
a memory, storing instructions, which when executed by the processor configure the processor to:
receive an user input associated with a selection of a speech recognition performance mode corresponding to one of an automatic mode and a manual mode;
recognize either one or both of a user feature and a speech recognition environment, in response to the selection of the automatic mode, the user feature comprising either one or both of an emotion and a personality type of a user
determine a speech recognition speed applied to speech recognition of a speech signal for the user based on the either one or both of the user feature and the speech recognition environment; and
perform speech recognition based on the determined speech recognition speed,
wherein the emotion of the user is determined using either one or both of a microphone to analyze a cadence and semantics of the user and a camera to analyze a facial expression of the user.

2. The apparatus of claim 1, wherein the processor is further configured to determine a value of a speech recognition parameter corresponding to the determined speech recognition speed.

3. The apparatus of claim 2, wherein the speech recognition parameter comprises one of a frame time, a window length, and a beam width.

4. The apparatus of claim 1, wherein the processor is further configured to determine the user feature as one of the personality type of the user, the emotion of the user, and a behavior pattern of the user.

5. The apparatus of claim 4, wherein the processor is further configured to:
monitor a usage pattern of the user; and
determine the personality type of the user based on the usage pattern.

6. The apparatus of claim 5, wherein the usage pattern is one of a device usage pattern of the user and a speech recognition usage pattern of the user.

7. The apparatus of claim 1, wherein the processor is further configured to:
recognize the user feature based on one of a facial expression of the user, a voice of the user, a bio-signal of the user, a message created by the user, and a typing pressure.

8. The apparatus of claim 1, wherein the processor is further configured to:
determine the speech recognition environment based on one of a global positioning system (GPS) sensor, a bio-signal of the user, and an application or function implemented by the processor corresponding to a user environment.

9. The apparatus of claim 1, wherein the processor is further configured to:
receive both an input associated with a user feature and an input associated with a user environment;
determine both the user feature and the speech recognition environment; and
determine the speech recognition speed based on both of the determined user feature and the speech recognition environment.

10. The apparatus of claim 1, wherein the processor is further configured to:
determine the speech recognition speed based on one of the user feature and the speech recognition environment according to an order of priority indicating which of the user feature and a user environment is used.

11. The apparatus of claim 1, wherein the processor is further configured to:
provide a user interface;
receive a user input with respect to a speech recognition speed selected from the user interface; and
perform speech recognition based on the selected speech recognition speed.

12. The apparatus of claim 11, wherein the memory is further configured to store a predetermined value of a speech recognition parameter corresponding to one of a speech recognition speed and a speech recognition speed interval, and the processor is further configured to
perform speech recognition based on a value of the speech recognition parameter corresponding to the selected speech recognition speed.

13. The apparatus of claim 1, wherein the processor is further configured to:
perform incremental speech recognition to output a speech recognition result when the speech signal is input.

14. A speech recognition method implemented by a processor of a speech recognition apparatus, the method comprising:
receiving an user input associated with a selection of a speech recognition performance mode corresponding to one of an automatic mode and a manual mode;
recognizing either one or both of a user feature and a speech recognition environment, in response to the selection of the automatic mode, the user feature comprising either one or both of an emotion and a personality type of a user
determining a speech recognition speed applied to speech recognition of a speech signal for the user based on the either one or both of the user feature and the speech recognition environment; and
performing speech recognition based on the determined speed,
wherein the emotion of the user is determined using either one or both of a microphone to analyze a cadence and semantics of the user and a camera to analyze a facial expression of the user.

15. The method of claim 14, wherein the determining a value of a speech recognition parameter comprises determining the speech recognition parameter as comprising one of a frame time, a window length, and a beam width.

16. The method of claim 7, further comprising:
determining the user feature as one of the personality type of the user, the emotion of the user, and a behavior pattern of the user.

17. The method of claim 16, wherein the determining the user feature comprises:
monitoring a usage pattern of the user; and determining the personality type of the user based on the usage pattern.

18. The method of claim 17, wherein the monitoring a usage pattern of the user comprises monitoring one of a device usage pattern of the user and a speech recognition usage pattern of the user.

19. The method of claim 14, wherein the determining the user feature comprises analyzing one of a facial expression of the user, a voice of the user, a bio-signal of the user, a message created by the user, and a typing pressure.

20. The method of claim 14, further comprising:
determining the speech recognition environment feature based on one of a global positioning system (GPS) sensor, a bio-signal of the user, an application or function implemented by the processor corresponding to a user environment.

21. The method of claim 14, wherein the recognizing either one or both of the user feature and the speech recognition environment comprises recognizing both the user feature and the speech recognition environment and determining the speech based on both of the determined user feature and the speech recognition environment.

22. The method of claim 14, further comprising:
determining an order of priority indicating which of the user feature and the speech recognition environment is used to determining the speech recognition speed; and
determining the speech recognition speed using one of the recognized one of the user feature or the speech recognition environment based on the determined order of priority.

23. The method of claim 14, the method further comprising:
providing a graphical user interface for the speech recognition apparatus;
receiving a user input with respect to a speech recognition speed selected from the user interface; and
performing speech recognition of the speech signal based on the selected speech recognition speed.

24. The method of claim 23, further comprising:
storing a predetermined value of a speech recognition parameter corresponding to one of a speech recognition speed and a speech recognition speed interval; and
performing speech recognition of the speech signal based on a value of a speech recognition parameter corresponding to the selected speech recognition speed.

25. The method of claim 14, wherein the performing of the speech recognition based on the determined speech recognition speed comprises performing incremental speech recognition on the speech signal to output a speech recognition result.

26. A non-transitory computer-readable storage medium comprising instructions, which when executed by the processor, cause the processor to perform a method comprising:
receiving an user input associated with a selection of a speech recognition performance mode corresponding to one of an automatic mode and a manual mode;
recognizing either one or both of a user feature and a speech recognition environment, in response to the selection of the automatic mode, the user feature comprising either one or both of an emotion and a personality type of a user;
determining a speech recognition speed applied to speech recognition of a speech signal for the user based on the either one or both of the user feature and the speech recognition environment; and
performing speech recognition based on the determined speed, wherein the emotion of the user is determined using either one or both of a microphone to analyze a cadence and semantics of the user and a camera to analyze a facial expression of the user.

* * * * *